United States Patent
Kursula et al.

(10) Patent No.: US 7,162,207 B2
(45) Date of Patent: Jan. 9, 2007

(54) SYSTEM, APPARATUS, METHOD AND COMPUTER PROGRAM FOR PRODUCING SIGNALS FOR TESTING RADIO FREQUENCY COMMUNICATION DEVICES

(75) Inventors: Mikko Kursula, Oulu (FI); Juhani Tapaninen, Oulu (FI)

(73) Assignee: Elektrobit Oy, Oulu (FI)

( * ) Notice: Subject to any disclaimer, the term of this patent is extended or adjusted under 35 U.S.C. 154(b) by 407 days.

(21) Appl. No.: 10/873,406

(22) Filed: Jun. 21, 2004

(65) Prior Publication Data

US 2005/0282502 A1    Dec. 22, 2005

(51) Int. Cl.
*H04B 17/00* (2006.01)

(52) U.S. Cl. ............................. 455/67.14; 455/67.11; 455/423; 455/68; 455/504; 370/247; 370/249; 370/342; 370/335; 375/225; 375/224; 375/227; 375/226; 375/298

(58) Field of Classification Search ............ 455/67.14, 455/423, 424, 68, 67.11, 504; 370/247, 249; 375/224, 227, 226, 298
See application file for complete search history.

(56) References Cited

U.S. PATENT DOCUMENTS

| | | | |
|---|---|---|---|
| 5,539,772 A | | 7/1996 | Fasulo, II et al. |
| 5,737,693 A | | 4/1998 | Aldridge et al. |
| 5,920,592 A | * | 7/1999 | Tanaka et al. ............... 375/220 |
| 5,937,004 A | * | 8/1999 | Fasulo et al. ............... 375/224 |
| 5,966,428 A | * | 10/1999 | Ortiz Perez et al. ..... 379/27.02 |
| 6,061,394 A | * | 5/2000 | Itahara ........................ 375/227 |
| 6,108,529 A | * | 8/2000 | Vice et al. ................... 455/323 |
| 6,344,749 B1 | * | 2/2002 | Williams ..................... 324/620 |
| 6,831,955 B1 | * | 12/2004 | Takahashi .................... 375/298 |
| 6,915,113 B1 | * | 7/2005 | Cardiff ...................... 455/67.14 |
| 6,993,069 B1 | * | 1/2006 | Donati et al. ................. 375/224 |

* cited by examiner

*Primary Examiner*—Marceau Milford
(74) *Attorney, Agent, or Firm*—Hoffman & Baron, LLP (57) ABSTRACT

A system, apparatuses, a method, and a computer program for producing signals for testing radio frequency communication devices are provided. The system comprises a non-real-time domain which includes a data generator for supplying a temporally discontinuous data stream which data stream includes signal waveform data and control data defining characteristics of a conversion from the signal waveform data into a radio frequency test signal. The temporally discontinuous data stream is fed into a transformer which transforms the temporally discontinuous data stream into a temporally continuous data stream, thus providing a transformation between the non-real-time domain and a real-time domain. The real-time domain includes a radio frequency unit which uses the temporally continuous signal data stream as input, and performs the conversion from the signal waveform data into the radio frequency test signal according to the control data.

14 Claims, 3 Drawing Sheets

SYSTEM, APPARATUS, METHOD AND COMPUTER PROGRAM FOR PRODUCING SIGNALS FOR TESTING RADIO FREQUENCY COMMUNICATION DEVICES

FIELD OF THE INVENTION

The invention relates to a system for producing radio frequency signals for testing radio frequency communication devices, an apparatus for producing radio frequency signals for testing radio frequency communication devices, an apparatus for producing signals for testing radio frequency communication devices, a method of producing signals for testing radio frequency communication devices, and a computer program for executing a computer process for producing radio frequency signals for testing a radio frequency communication device.

BRIEF DESCRIPTION OF THE RELATED ART

Radio frequency communication devices, such as cellular phones, are usually tested by delivering a radio frequency test signal into a radio receiver of the communication device and by analyzing the response of the communication device to the radio frequency test signal. A reliable test requires real-time characteristics, such as the temporal, power and frequency characteristics, of the radio frequency test signal. In order to obtain real-time characteristics, high performance is required from a test system for generating such radio frequency test signals.

Therefore, it is useful to consider techniques for producing signals for testing radio frequency communication devices.

SUMMARY OF THE INVENTION

An object of the invention is to provide a method, a system, a computer program and apparatuses which method, system, computer program and apparatuses enable radio frequency test signals with accurate real-time characteristics to be produced.

According to a first aspect of the invention, there is provided a method of producing radio frequency signals for testing radio frequency communication devices, comprising: supplying a temporally discontinuous data stream including signal waveform data and control data defining characteristics of a conversion from the signal waveform data into a radio frequency test signal; transforming the temporally discontinuous data stream into a temporally continuous data stream; and performing the conversion from the signal waveform data into the radio frequency test signal according to the control data by using at least a portion of the temporally continuous data stream as input.

According to a second aspect of the invention, there is provided a system for producing radio frequency signals for testing radio frequency communication devices, comprising: a data generator for supplying a temporally discontinuous data stream including: signal waveform data; and control data defining characteristics of a conversion from the signal waveform data into a radio frequency test signal, the system further comprising: a transformer for transforming the temporally discontinuous data stream into a temporally continuous data stream; and a radio frequency unit for performing, by using the temporally continuous signal data stream as input, the conversion from the signal waveform data into the radio frequency test signal according to the control data.

According to a third aspect of the invention, there is provided a computer program embodied on a computer readable medium, for executing a computer process for producing radio frequency signals for testing a radio frequency communication device, the computer process including steps, the steps comprising: supplying a temporally discontinuous data stream including signal waveform data and control data defining characteristics of a conversion from the signal waveform data into a radio frequency test signal; controlling a process of transforming the temporally discontinuous data stream into a temporally continuous data stream; and controlling a process of converting the signal waveform data into the radio frequency test signal according to the control data by using at least a portion of the temporally continuous signal data stream as input.

According to a fourth aspect of the invention, there is provided an apparatus for producing signals for testing radio frequency communication devices, comprising: a data generator for supplying a temporally discontinuous data stream including: signal waveform data; and control data defining characteristics of a conversion from the signal waveform data into a radio frequency test signal.

According to yet another aspect of the invention, there is provided an apparatus for producing radio frequency signals for testing radio frequency communication devices, comprising: a transformer for transforming a temporally discontinuous data stream into a temporally continuous data stream, which temporally discontinuous data stream comprises signal waveform data and control data defining characteristics of a conversion from the signal waveform data into a radio frequency test signal; and a radio frequency unit for performing, by using the temporally continuous signal data stream as input, the conversion from the signal waveform data into the radio frequency test signal according to the control data.

Preferred embodiments of the invention are described in the dependent claims.

The system, apparatuses, method, and computer program of the invention provide several advantages. In a preferred embodiment of the invention, signal waveform data and control data are generated in a non-real time domain and transported to a transformer in a discontinuous data stream. The transformer transforms the discontinuous data stream into a continuous data stream having real-time characteristics. The continuous data stream including the signal waveform data and the control data is delivered to a radio frequency unit which converts the signal waveform data into a radio frequency test signal according to the control data transported in the continuous data stream. The use of the non-real-time domain enables cost-effective electronics to be used for supplying data for the radio frequency test signal while the transformation from the non-real-time domain to the real-time domain enables high quality radio frequency test signals to be obtained.

BRIEF DESCRIPTION OF THE DRAWINGS

In the following, the invention will be described in greater detail with reference to preferred embodiments and the accompanying drawings, in which.

DETAILED DESCRIPTION OF THE PREFERRED EMBODIMENTS

Figure 1:
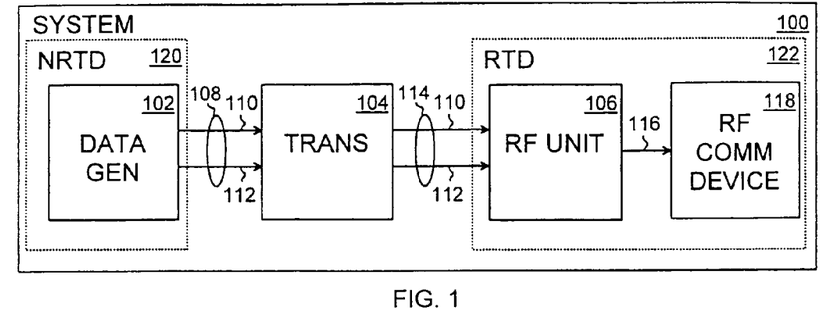
FIG. 1 shows a first example of a system according to embodiments of the invention.

FIG. 1 shows a system 100 comprising a data generator (DATA GEN) 102, a transformer (TRANS) 104 connected to the data generator 102, and a radio frequency unit (RF UNIT) 106 connected to the transformer 104. The radio frequency unit 106 outputs a radio frequency test signal 116 which is inputted into a radio frequency communication device (RF COMM DEVICE) 118 to be tested.

In an embodiment of the invention, the data generator 102 is connected to a plurality of transformers.

The radio frequency communication device 118 may be, for example, a cellular phone and/or a base station and/or a radio modem. The invention is not, however, restricted to the given examples, but may be applied to a wide range of communication devices including a radio receiver.

The data generator 102 supplies a temporally discontinuous data stream 108, herein referred to as a discontinuous data stream 108, into the transformer 104. The discontinuous data stream 108 includes signal waveform data 110 and control data 112.

The transformer 104 transforms the discontinuous data stream 108 into a temporally continuous data stream 114, herein referred to as a continuous data stream 114. The continuous data stream 114 includes at least a portion of the signal waveform data 110 and at least a portion of the control data 112.

The continuous data stream 114 is inputted into the radio frequency unit 106 which uses the continuous data stream 114 as input and performs a conversion from the signal waveform data 110 into the radio frequency test signal 116 according to the control data 112.

The discontinuous data stream 108 is typically a sequence of digitally encoded signals which are used for representing information associated with the radio frequency test signal 116.

The discontinuous data stream 108 typically includes discontinuities during which a data flow is interrupted. An instantaneous data rate of the discontinuous data stream 108 is typically inconstant.

The signal waveform data 110 typically includes payload of the radio frequency test signal 116. The signal waveform data 110 may further include coding, such as spreading and scrambling coding. In an embodiment of the invention, the signal waveform data 110 represents a WCDMA (Wide Band Code Division Multiple Access) signal in a digital form.

In another embodiment of the invention, the signal waveform data 110 produces time slots of GSM (Global System for Mobile communications) bursts when converted into the radio frequency test signal 116. The control data 112 controls the conversion from the signal waveform data 110 into the radio frequency test signal 116 and defines characteristics, such as frequency characteristics and power characteristics, associated with the conversion.

The system 100 may be divided into a non-real-time domain (NRTD) 120 and a real-time domain (RTD) 122. The real-time domain 122 includes the radio frequency unit 106, i.e. a system part where the signal waveform data 110 and the control data 112 are transferred in such a time scale and format that the resulting radio frequency test signal 116 fulfils requirements set by the radio frequency communication device 118 under test. Such requirements are usually defined by the specifications, such as the 3GPP ($3^{rd}$ Generation Partnership project) specification, of the telecommunications system supported by the radio frequency communication device 118. The continuous data stream 114 has real-time characteristics.

The non-real-time domain 120 includes the data generator 102, i.e. a system part where the signal waveform data 110 and the control data 112 are typically transferred in a free time scale and format, provided that the free time scale average coincides with the real-time time scale average. That is, for example, the average data rate applied to the signal waveform data 110 and to the control data 112 in the non-real-time domain 120 converges to an average data rate applied in the real-time domain 122. The discontinuous data stream 108 has non-real-time characteristics.

The transformer 104 acts as a buffering and scheduling mechanism between the non-real-time domain 102 and the real time domain 122. The transformer 104 receives and buffers signal waveform data 110 and control data 112 delivered by the discontinuous data stream 108. A buffering of the signal waveform data 110 and the control data 112 enables bits of the discontinuous data stream 108 to be temporarily stored. Scheduling the signal waveform data 110 and the control data 112 in an appropriate manner enables a continuous data stream 114 to be formed and delivered to the radio frequency unit 106 for a virtual transmission to the radio frequency communication device 118.

Figure 2:
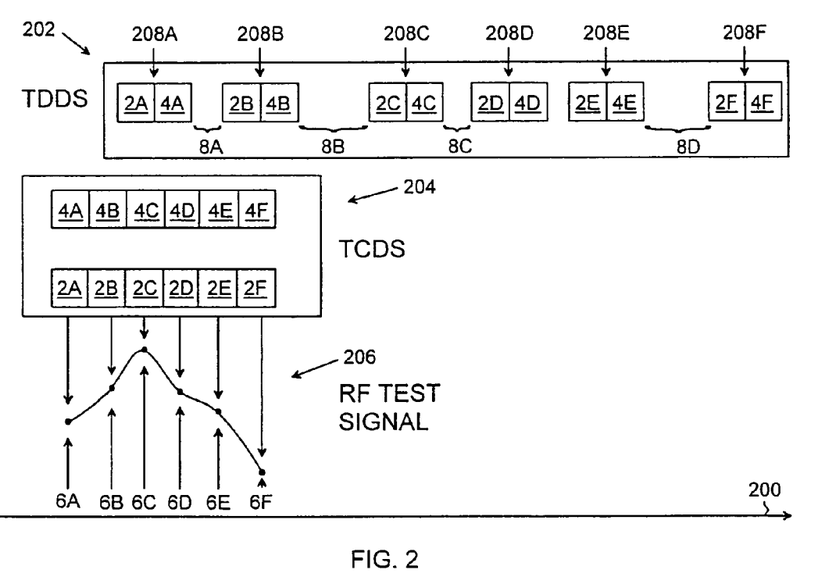
FIG. 2 shows examples of data streams according to embodiments of the invention.

With reference to FIG. 2, examples of the discontinuous data stream (TDDS) 202, the continuous data stream (TCDS) 204, and the radio frequency test signal (RF TEST SIGNAL) 206 are shown. The horizontal axis 200 shows time in arbitrary units.

The discontinuous data stream 202 may be divided into successive data units 208A to 208F. A data unit 208A to 208F may include a signal waveform data part 2A to 2F and a control data part 4A to 4F.

In an embodiment of the invention, the occurrence rate of control data parts 4A to 4F is lower than the occurrence rate of the signal waveform data parts 2A to 2F, i.e. not every data unit 208A to 208F carries control data. This may be applied to systems where the timescale in controlling the radio frequency unit 106 is longer than the timescale of the signal waveform. In such a case, a single control data part 4A to 4F is associated with a plurality of waveform data parts, the single control data part 4A to 4F defining the characteristics of the conversion from the plurality of control data parts into the radio frequency test signal.

The discontinuous data stream 202 may include time gaps 8A to 8D between data units 208A to 208F. The duration of each time gap 8A to 8D may be arbitrary, provided that the average data rate of the discontinuous data stream 108 fulfils the requirements of the radio frequency test signal 206.

The time gaps 8A to 8D may result from, for example, a change in the load of the data generator 102. This may especially be the case when the data generator 102 is implemented with a personal computer or another system whose load may vary in an unpredictable manner.

The time gaps 8A to 8D may also result from data unit scheduling carried out in the data generator 102. The data unit scheduling may be needed, for example, for protecting the transformer 104 from overload.

A data unit 208A to 208F typically includes information needed to construct the radio frequency test signal 206 at a radio frequency test signal time instant 6A to 6F. For example, the signal waveform data of the data signal waveform data part 2B and the control data of the control data part 4B may define signal characteristics, such as frequency and power, of the radio frequency test signal 206 at time instant 6B.

The continuous data stream 204 typically includes the signal waveform data parts 2A to 2F and the control data parts 4A to 4F in a timing sequence required by the radio frequency test signal 206.

In an embodiment of the invention, the signal waveform data part 2A to 2F and the control data part 4A to 4F, both corresponding to a radio frequency test signal time instant 6A to 6F, are outputted simultaneously, thus resulting in an accurate relative timing of the signal waveform data and control of the radio frequency unit 106.

In an embodiment of the invention, the discontinuous data stream 202 is delivered in a serial format into the transformer 104. The transformer 104 may change the serial format into a parallel format and output the continuous data stream 204 in a parallel format. In some applications, the continuous data stream 204 may include parts in a parallel format and parts in a serial format. For example, the signal waveform data parts 2A to 2F may be outputted in a parallel format and the control data parts 4A to 4F may be outputted in a serial format.

In an embodiment of the invention, the discontinuous data stream is delivered in a parallel format into the transformer 104. The transformer 104 may change the parallel format into a serial format and output the continuous data stream 204 in a serial format. In an embodiment of the invention, the transformer 104 outputs a portion of the continuous data stream 204 in a serial format and another portion in a parallel format.

Figure 3:
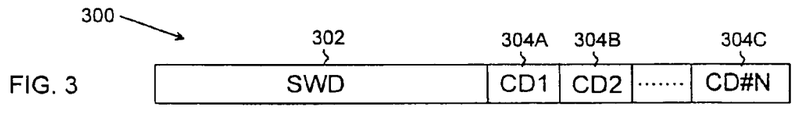
FIG. 3 shows a first example of a data structure according to an embodiment of the invention.

With reference to FIG. 3, a data unit 300 may include a plurality of control data parts (CD1, CD2, CD#N) 304A, 304B, 304C, each of which having a specific control function. Furthermore, a signal waveform data part (SWD) 302 is shown.

A control data part 304A may include control data for controlling, for example, the frequency of the radio frequency test signal 206 at which the signal waveform data part 302 is modulated in the radio frequency test signal 206. Another control data part 304B may include, for example, control data controlling the power of the radio frequency test signal 206. The control function of each control data part 304A, 304B, 304C may be defined by the location of the control data part 304A, 304B, 304C in the data unit 300. The data unit 300 may be transported in a serial and/or parallel format and/or in a combination thereof. The format of the data unit 300 may be applied to the discontinuous data stream 108 and/or the continuous data stream 114.

Figure 4:
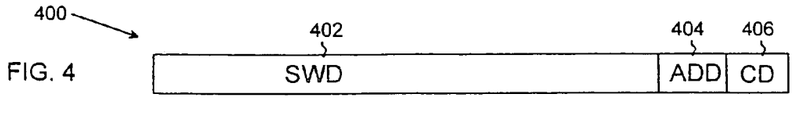
FIG. 4 shows a second example of a data structure according to an embodiment of the invention.

With reference to FIG. 4, a data unit 400 may include an address field (ADD) 404 for indicating a control function of the control data part (CD) 406. The address field 404 may indicate, for example, that the control data part 406 includes control data for adjusting the gain of the radio frequency unit 106 while generating the radio frequency test signal 206 from the signal waveform data part 402. In some embodiments, the address field 404 may be able to indicate that the control data part 406 includes signal waveform data. The data unit 400 may be transported in a serial and/or parallel format and/or in a combination thereof. The format of the data unit 400 may be applied to the discontinuous data stream 108 and/or the continuous data stream 114.

Figure 5:
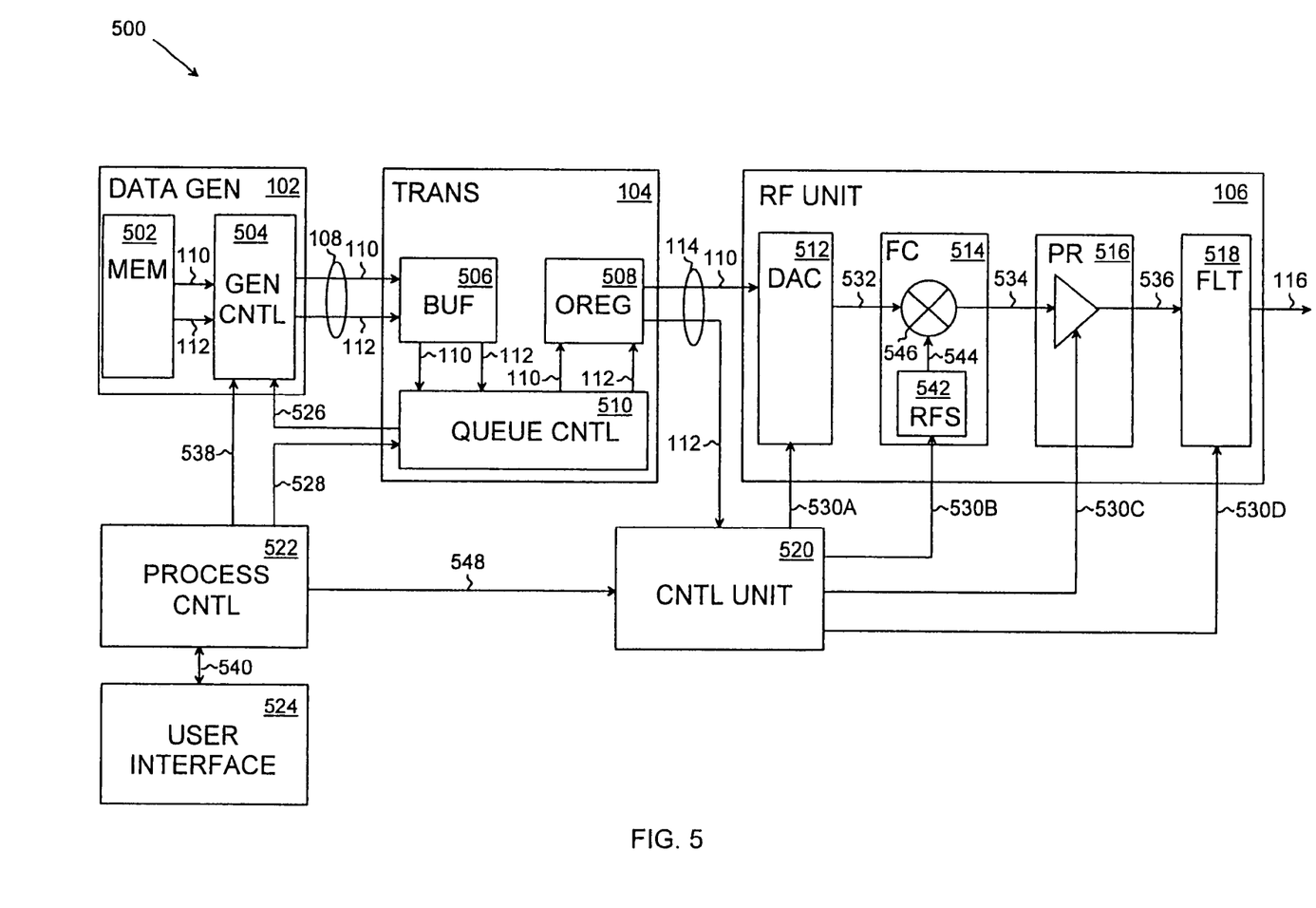
FIG. 5 shows a second example of a system according to embodiments of the invention.

With reference to an example of the system 500 shown in FIG. 5, the data generator 102 may include a memory unit (MEM) 502, and a generator controller (GEN CNTL) 504.

The generator controller 504 may retrieve the waveform data 110 and the control data 112 from the memory unit 502 and form the discontinuous data stream 108 from signal waveform data 110 and the control data 112. The generator controller 502 may input the discontinuous data stream 108 into the transformer 104.

The memory unit 502 may include a plurality of data files which include different types of signal waveform data 110 and control data 112 for various types of radio frequency test signals 116. Different types of radio frequency test signals 116 may be dedicated, for example, for time synchronization, frequency synchronization, channel estimation, and/or testing different characteristics of the radio frequency communication device 118, and downloaded into the generator controller 504 when necessary. In some embodiments, the radio frequency test signal 116 may include a power ramp for characterizing the receiver of the radio frequency communication device 118. In some other embodiments, the radio frequency test signal 116 is a modulated signal for measuring the sensitivity and/or bit error rate of the radio frequency communication device 118.

The generator controller 504 may be implemented with a digital signal processor and software, for example. Some parts of the generator controller unit 504 may be implemented with an ASIC (Application Specific Integrated Circuit).

In an embodiment of the invention, a portion of the generator controller 504 is implemented as a software application in the processor of a personal computer. Some functionalities associated with supplying the discontinuous data stream 110 may also be carried out in a peripheral card connected to the personal computer over a standard bus, such as a PCI (Peripheral Component Interconnect) bus.

The transformer 104 may include a buffer memory (BUF) 506 which receives and temporarily stores the discontinuous data stream 108. The transformer 104 may further include a queue controller (QUEUE CNTL) 510 which retrieves the signal waveform data 110 and the control data 112 stored in the buffer memory 506. The queue controller 510 is typically responsible for organizing the signal waveform data 110 and the control data 112 into an order required by the continuous data stream 114.

The queue controller 510 inputs the signal waveform data 110 and the control data into an output register (OREG) 508. The queue controller 510 may include a real-time clock which synchronizes the outputting of the signal waveform data 110 and the control data.

The queue controller 510 may monitor the filling degree of the buffer memory 506 and generate a buffer status signal 526 for the generator controller 504. The buffer status signal 526 may inform the generator controller 504, for example, about a need to interrupt the supply of the control data 112 and the signal waveform data 110 if the filling degree of the buffer memory 506 exceeds a threshold. For example, if 90% of the buffer memory is full, the buffer status signal 526 may request an interruption in a data supply in the generator controller 504.

The buffer memory 506 may be implemented with an SDRAM (Synchronous Dynamic Random Access Memory) or another memory technology known to one skilled in the art.

The queue controller 510 may be implemented with a digital processor and software. Applications may exist where a part of the queue controller 510 is implemented with ASIC and/or FPGA/Field Programmable Gate Array) technology.

In an embodiment of the invention, the transformer 104 transforms the discontinuous data stream 108 into the continuous data stream 114 such that the order of the signal waveform data 110 remains and the order of the control data 112 remains in the transformation.

The transformer 104 may include a FIFO (First-In First-Out) algorithm and/or a circuit which applies an approach where the oldest program work requests from queues or stacks are handled next, thus remaining the order of the control data 112 and the order of the signal data 110. A FIFO approach generally enables non-real-time data to be inputted into the transformer 104 and real-time data to be outputted from the transformer 104.

The data structure of the discontinuous data stream 202 and that of the continuous data stream 204 shown in FIG. 2 illustrate a FIFO ordering of data. For example, a signal waveform data part 2F and the control data part 4F represent a first piece of the signal waveform data and a first piece of control data, respectively, in the discontinuous data stream 202 and in the continuous data stream 204.

In an embodiment of the invention, the control data 112 of the continuous data stream 114 are delivered to a control unit (CNTL UNIT) 520 connected to the transformer 104 and the radio frequency unit 106. The control unit 520 controls the radio frequency unit 106 according to the control data 112.

The signal waveform data 110 may be delivered to the radio frequency unit 106.

It should be noted that even though the signal waveform data 110 and the control data 112 are delivered into separate system elements, such as the control unit 520 and the radio frequency unit 196, the signal waveform data 110 and the control data 112 may be considered to be included in the continuous data stream 114 in terms of timing of the control data parts 4A to 4F and signal waveform data parts 2A to 2F.

The control unit 520 inputs the control data 112 and may generate device-specific control signals 530A to 530D delivered to various devices 512, 514, 516, 518 of the radio frequency unit 106.

The control unit 520 may, for example, extract the control data parts 304A to 304C from a data unit 300 shown in FIG. 3 based on, for example, a predefined location of the control data parts 304A to 304C in the data unit 300. In such a case, the control unit 520 may require a priori information on the data structure of the data unit 300.

Each control data part 304A to 304C may be transformed into a device-specific control signal 530A to 530D in the control unit 520.

In an embodiment of the invention, the control unit 520 reads the address field 404 of a data unit 400, generates a device-specific control signal 530A to 530D according to the control data part 406, and routes the device-specific control signal 530A to 530D to a device 512 to 518 indicated by the address field 404.

A device-specific control signal 530A to 530D may be an analog signal. In such a case, a digital-to-analog converter may be required in the control unit 520 to convert a control signal part 304A to 304C, 406 into analog form. The device-specific control signal 530A to 530D may include the control information as a voltage level, for example.

The control unit 520 may be implemented with a digital signal processor and software. Furthermore, the control unit 520 may include electrical circuits for processing analog electric signals for producing appropriate voltage levels, for example, for the device-specific control signals 530A to 530D.

Parts of the control unit 520 may be integrated into the transformer 104 and/or the radio frequency unit 106. The actual location of the control unit 520 does not, however, play essential role regarding the embodiments of the invention.

In an embodiment of the invention, the radio frequency unit 106 includes a digital-to-analog converter (DAC) 512 which converts the signal waveform data 110 from a digital form into an analog form according to the control data 112. In such a case, the control data 112 may include, for example, information for adjusting the gain of the digital-to-analog converter 512, information for adjusting the interpolation carried out in the digital-to-analog converter 512, information for adjusting an analog and/or digital filtering carried out in the digital-to-analog converter 512, and information for an ON/OFF adjustment of the output of the digital-to-analog converter 512. The control unit 520 transforms a control data part 304A to 304C, 406 dedicated to the digital-to-analog converter control into a digital-to-analog-converter-specific control signal 530A which is delivered to the digital-to-analog converter 512.

In an embodiment of the invention, the radio frequency unit 106 includes a frequency converter (FC) 514 for converting the signal waveform data 110 from a base band frequency to a radio frequency according to the control data 112.

The frequency converter 514 may include a mixer 546 for mixing analog signal waveform data 532 and a reference frequency signal 544 in order to produce a radio frequency test signal 534.

The reference frequency signal 544 may be generated in a reference frequency source (RFS) 542, such as a voltage-controller oscillator controlled by a phase-locked loop.

A control data part 304A to 304C, 406 dedicated for controlling the frequency converter 514 may include, for example, a binary control word which defines a conversion factor used in a divider of a feedback circuit of the phase-locked loop. The binary control word is delivered to the reference frequency generator 542 in a frequency converter-specific control signal 530B.

The frequency converter-specific control signal 530B may, for example, define a carrier frequency, power level, and/or bandwidth of the radio frequency test signal 116. The carrier frequency may be changed, for example, when testing frequency hopping characteristics of the radio frequency communication device 118.

In an embodiment of the invention, the radio frequency unit 106 includes a power regulator 516 for regulating the power of the radio frequency test signal 534 according to the control data 112. Depending on the embodiment, the power regulator 516 may amplify and/or attenuate the radio frequency test signal 534.

In an embodiment of the invention, a radio-frequency unit specific control signal 530C fed into the power regulator 516 may include information for adjusting e.g. switch positions of radio frequency attenuators of the power regulator 516. Analog voltage levels possibly required in the power regulator 516 may be generated in a circuitry located in the power regulator 516.

In an embodiment of the invention, the radio frequency unit includes a radio frequency filter 518 for attenuating undesired radio frequency components from the radio frequency test signal 536 according to the control data 112. The radio frequency filter 518 may include, for example, a filter bank from which a suitable combination of electric components is selected according to a radio frequency filter-specific control signal 530D.

The use of the continuous data stream 114 in transporting the signal waveform data 110 and the control data 112 enables an accurate timing to be provided for the control of the devices 512 to 518 of the radio frequency unit 106 during the conversion of the signal waveform data 110 into the radio frequency test signal 116. As a result, a radio frequency test signal 116 with accurate time characteristics is provided.

The system 500 may further include a process controller 522 for controlling a process for producing a test signal.

The process controller 522 may signal process control signals 538 to the data generator 102 in order to initiate a procedure for producing a radio frequency test signal. The process control signals 538 may further include commands associated with different signal waveforms of the signal waveform data 110, information on signal waveform data sequences, and information on the contents of the control data 112. The process controller may 522 may control the control unit 520 with general parameters 548 which may include information e.g. on clock frequency and/or the length of the continuous data stream 114.

The process controller 522 may further feed a queue control signals 528 into the queue controller 510.

The data generator 102 and the process controller 522 may be implemented with a personal computer and appropriate software. A user interface 524 including a keyboard, a joystick, and/or a display, for example, may be connected to the process controller 522. The user interface 524 may be used for inputting user instructions 540 into the system 500 and displaying the state of the system 500.

The user interface 524 may further act as an interface between the system 500 and another system, such as a larger testing entity, from which the system 500 may be controlled.

Figure 6:
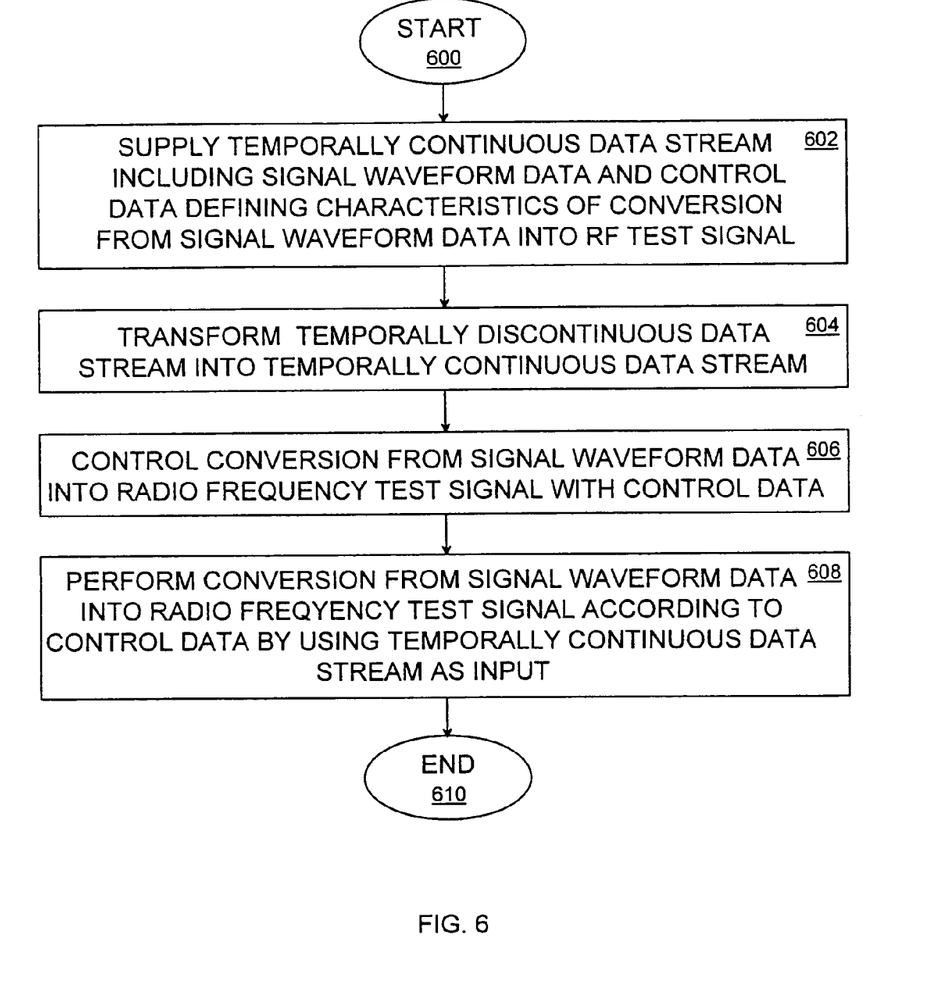
FIG. 6 illustrates a methodology according to embodiments of the invention.

With reference to FIG. 6, a method according to embodiments of the invention starts in 600.

In 602, a temporally discontinuous data stream 108 including signal waveform data 110 and control data 112 defining characteristics of a conversion from the signal waveform data 110 into a radio frequency test signal 116 is supplied.

In an embodiment of the invention, a temporally discontinuous data stream 202 includes successive data units 208A to 208F which comprise: a signal waveform data part 2A to 2F including signal waveform data which correspond to a radio frequency test signal time instant 6A to 6F; and a control data part 4A to 4F including control data which correspond to the radio frequency test signal time instant 6A to 6F.

In 604, the temporally discontinuous data stream 108 is transformed into a temporally continuous data stream 114.

In an embodiment of the invention, the temporally discontinuous data stream 108 is transformed into the temporally continuous data stream 114 such that the order of the signal waveform data 110 remains and the order of the control data 112 remains.

In 606, at least one element is controlled with control data 112, the at least one element being selected from a group comprising: a frequency converter 514 which converts the signal waveform data 532 from a base band frequency to a radio frequency; a digital-to-analog converter 512 which converts the signal waveform data 110 from a digital form into an analog form; a power regulator 516 which regulates the power of the radio frequency test signal 534; and a radio frequency filter 518 which attenuates undesired radio frequency components from the radio frequency test signal 536.

In 608, a conversion from the signal waveform data 110 into the radio frequency test signal 116 is performed according to the control data 112 by using at least a portion of the temporally continuous data stream 114 as input.

In 610, the method ends.

In an aspect of the invention, a computer program embodied on a computer readable medium is provided. The computer program includes coding for executing a computer process of supplying a temporally discontinuous data stream 108 including signal waveform data 110 and control data 112 defining characteristics of a conversion from the signal waveform data 110 into a radio frequency test signal 116. The computer program further includes instructions to control the methodology described in the flow chart of FIG. 6.

The computer readable medium may include, for example, a distribution medium, a program storage medium, a record medium, a computer readable memory, a computer readable software distribution package, a computer readable signal, a computer readable telecommunications signal, and a computer readable compressed software package.

Even though the invention has been described above with reference to an example according to the accompanying drawings, it is clear that the invention is not restricted thereto but it can be modified in several ways within the scope of the appended claims.

What is claimed is:

1. A system for producing radio frequency signals for testing radio frequency communication devices, comprising:
   a data generator for supplying a temporally discontinuous data stream including:
   signal waveform data; and
   control data defining characteristics of a conversion from the signal waveform data into a radio frequency test signal, the system further comprising:
   a transformer for transforming the temporally discontinuous data stream into a temporally continuous data stream; and
   a radio frequency unit for performing, by using the temporally continuous signal data stream as input, the conversion from the signal waveform data into the radio frequency test signal according to the control data.

2. The system of claim 1, wherein the data generator is configured to supply a temporally discontinuous data stream including successive data units, which comprise:
   a signal waveform data part including signal waveform data which correspond to a radio frequency test signal time instant; and
   a control data part including control data which correspond to the radio frequency test signal time instant; and
   the transformer is configured to output the signal waveform data part and the control data part simultaneously.

3. The system of claim 1, wherein the radio frequency unit further comprises at least one element selected from a group including:
   a frequency converter for converting the signal waveform data from a base band frequency to a radio frequency according to the control data;
   a digital-to-analog converter for converting the signal waveform data from a digital form into an analog form according to the control data;
   a power regulator for regulating the power of the radio frequency test signal according to the control data; and a radio frequency filter for attenuating undesired radio frequency components from the radio frequency test signal according to the control data.

4. The system of claim 1, further comprising a control unit connected to the radio frequency unit and the transformer, for controlling the radio frequency unit according to the control data.

5. The system of claim 1, wherein the transformer is configured to transform the temporally discontinuous data stream into the temporally continuous data stream such that the order of the signal waveform data remains and the order of the control data remains.

6. An apparatus for producing radio frequency signals for testing radio frequency communication devices, comprising:
 a transformer for transforming a temporally discontinuous data stream into a temporally continuous data stream, which temporally discontinuous data stream comprises signal waveform data and control data defining characteristics of a conversion from the signal waveform data into a radio frequency test signal; and
 a radio frequency unit for performing, by using the temporally continuous signal data stream as input, the conversion from the signal waveform data into the radio frequency test signal according to the control data.

7. An apparatus for producing signals for testing radio frequency communication devices, comprising:
 a data generator for supplying a temporally discontinuous data stream including:
 signal waveform data; and
 control data defining characteristics of a conversion from the signal waveform data into a radio frequency test signal.

8. The apparatus of claim 7, wherein the data generator is configured to supply a temporally discontinuous data stream including successive data units, which comprise:
 a signal waveform data part including signal waveform data which correspond to a radio frequency test signal time instant; and
 a control data part including control data which correspond to the radio frequency test signal time instant.

9. The apparatus of claim 7, wherein the control data includes instructions to control at least one element selected from a group comprising:
 a frequency converter which converts the signal waveform data from a base band frequency to a radio frequency;
 a digital-to-analog converter which converts the signal waveform data from a digital form into an analog form;
 a power regulator which regulates the power of the radio frequency test signal; and
 a radio frequency filter which attenuates undesired radio frequency components from the radio frequency test signal.

10. A method of producing radio frequency signals for testing radio frequency communication devices, comprising:
 supplying a temporally discontinuous data stream including signal waveform data and control data defining characteristics of a conversion from the signal waveform data into a radio frequency test signal;
 transforming the temporally discontinuous data stream into a temporally continuous data stream; and
 performing the conversion from the signal waveform data into the radio frequency test signal according to the control data by using at least a portion of the temporally continuous data stream as input.

11. The method of claim 10, wherein the step of supplying includes supplying a temporally discontinuous data stream including successive data units, which comprise:
 a signal waveform data part including signal waveform data which correspond to a radio frequency test signal time instant; and
 a control data part including control data which correspond to the radio frequency test signal time instant.

12. The method of claim 10, further comprising controlling with the control data at least one element selected from a group comprising:
 a frequency converter which converts the signal waveform data from a base band frequency to a radio frequency;
 a digital-to-analog converter which for converts the signal waveform data from a digital form into an analog form;
 a power regulator which regulates the power of the radio frequency test signal; and
 a radio frequency filter which attenuates undesired radio frequency components from the radio frequency test signal.

13. The method of claim 10, wherein the step of transforming includes transforming the temporally discontinuous data stream into the temporally continuous data stream such that the order of the signal waveform data remains and the order of the control data remains.

14. A computer program embodied on a computer readable medium, for executing a computer process for producing radio frequency signals for testing a radio frequency communication device, the computer process including steps, the steps comprising:
 supplying a temporally discontinuous data stream including signal waveform data and control data defining characteristics of a conversion from the signal waveform data into a radio frequency test signal;
 controlling a process of transforming the temporally discontinuous data stream into a temporally continuous data stream; and
 controlling a process of converting the signal waveform data into the radio frequency test signal according to the control data by using at least a portion of the temporally continuous signal data stream as input.

* * * * *

UNITED STATES PATENT AND TRADEMARK OFFICE
CERTIFICATE OF CORRECTION

| | | |
|---|---|---|
| PATENT NO. | : 7,162,207 B2 | Page 1 of 1 |
| APPLICATION NO. | : 10/873406 | |
| DATED | : January 9, 2007 | |
| INVENTOR(S) | : Mikko Kursula and Juhani Tapaninen | |

It is certified that error appears in the above-identified patent and that said Letters Patent is hereby corrected as shown below:

<u>ON THE TITLE PAGE</u>, item (73)    Assignee: now reads "Elektrobit Oy, Oulu (FI)"

should read --Elektrobit Testing Oy, Oulu (FI)--.

Signed and Sealed this

Twenty-third Day of September, 2008

JON W. DUDAS
*Director of the United States Patent and Trademark Office*